United States Patent
Lovato et al.

(10) Patent No.: US 6,868,202 B2
(45) Date of Patent: Mar. 15, 2005

(54) DEVICE FOR OPTICAL COMMUNICATION BETWEEN ELECTRONIC MODULES

(75) Inventors: Jean-Louis Lovato, Biviers (FR); Eric Bettega, Le Fontanil-Cornillon (FR); Vincent Minier, Claix (FR); Jean-Jacques Favre, Revel (FR)

(73) Assignee: Schneider Electric Industries SAS (FR)

( * ) Notice: Subject to any disclaimer, the term of this patent is extended or adjusted under 35 U.S.C. 154(b) by 0 days.

(21) Appl. No.: 10/480,297

(22) PCT Filed: Apr. 4, 2002

(86) PCT No.: PCT/FR02/01165

§ 371 (c)(1),
(2), (4) Date: Dec. 11, 2003

(87) PCT Pub. No.: WO02/101958

PCT Pub. Date: Dec. 19, 2002

(65) Prior Publication Data

US 2004/0175070 A1 Sep. 9, 2004

(30) Foreign Application Priority Data

Jun. 11, 2001 (FR) .............................................. 01 07565

(51) Int. Cl.[7] .............................. G02B 6/28; H04B 10/00
(52) U.S. Cl. .............................. 385/24; 385/31; 385/39; 385/47; 385/88; 398/118; 398/130
(58) Field of Search ............................... 385/24, 39, 40, 385/42, 47, 88, 92; 398/118, 130

(56) References Cited

U.S. PATENT DOCUMENTS

| | | | |
|---|---|---|---|
| 5,091,985 A | | 2/1992 | Heidemann ................... 385/33 |
| 5,659,643 A | * | 8/1997 | Appeldorn et al. ........... 385/31 |
| 5,923,800 A | | 7/1999 | Takano et al. ................. 385/45 |
| 6,307,987 B1 | * | 10/2001 | Wang et al. ................... 385/31 |
| 6,628,441 B1 | | 9/2003 | Staiger ........................ 359/163 |

FOREIGN PATENT DOCUMENTS

| | | |
|---|---|---|
| DE | 197 09 174 A1 | 9/1998 |
| EP | 0 833 178 A1 | 4/1998 |
| WO | WO 00/17687 | 3/2000 |

* cited by examiner

*Primary Examiner*—Brian Healy
*Assistant Examiner*—Derek L. Dupuis
(74) *Attorney, Agent, or Firm*—Parkhurst & Wendel, L.L.P.

(57) ABSTRACT

The device enables bi-directional optical communication between a master module and slave modules by means of an optical rod (1) made of transparent material. The master module is axially coupled to the rod. The modules are arranged laterally along a useful part of the rod bounded by a lateral reflector located opposite the slave modules. The lateral reflector can be formed by a plurality of adjacent notches (12) formed at the surface of the rod and constituting a continuous reflecting zone in the form of serrated teeth, and/or by a narrow reflecting strip (17). The slave modules can be positioned anywhere along the useful part of the rod and their lateral location is not critical, a lateral coupling zone extending over at least 1 cm outside the rod. Such a device can be advantageously used in an electrical panel.

27 Claims, 5 Drawing Sheets

DEVICE FOR OPTICAL COMMUNICATION BETWEEN ELECTRONIC MODULES

CROSS REFERENCE TO RELATED APPLICATIONS

This application is a national phase application based on PCT/FR02/01165, filed Apr. 4, 2002, the content of which is incorporated herein by reference, and claims the right to priority based on foreign application FR 01/07565 filed Jun. 11, 2001, the content of which is incorporated herein by reference.

BACKGROUND OF THE INVENTION

The invention relates to a device for optical communication between electronic modules comprising an optically conducting rod, having first and second ends, designed to be optically coupled, by lateral coupling, to lateral electronic modules arranged laterally along the rod, and comprising lateral reflecting means arranged over a longitudinal part of the external surface of the rod opposite the lateral modules.

A large number of devices exist enabling optical interconnection of electronic modules.

In a first type of device, as described in the document EP-A-587,066 for example, an optical communication bus is formed by a plurality of modular electrical equipment units arranged side by side. Each unit is equipped on one side face with an opto-electronic receiver and on the opposite side face with an electro-optical transmitter electrically connected to the receiver. Each unit can thus communicate optically with the adjacent units. This type of device presents a major drawback in that, if one of the units fails, the communication chain is broken.

Backplane optical busses also exist, generally constituted by a plate made of glass or transparent plastic material comprising means for optical coupling with printed circuit boards, each board comprising at least one electro-optical transmitter and one opto-electronic receiver. Various coupling means, arranged on the face of the bus adjacent to the printed circuit boards, have been described, in particular windows made of a light-absorbing material (WO-A-8,503,179), grooves (GB-A-2,208,566) and diffraction networks (U.S. Pat. No. 5,091,985). U.S. Pat. No. 4,744,617 describes an optical bus of circular, square or polygonal cross-section, comprising as coupling elements inclined reflecting surfaces formed in the face of the bus opposite the printed circuit boards. In these different devices, the coupling elements are punctual and are fitted at predefined locations, associated to each of the printed circuit boards. The number of printed circuit boards and their locations are thus predefined.

In the document EP-A-249,746, a multimode optical fiber comprising a diffusing core enables optical communication between transmitter and receiver stations that are coupled laterally thereto. The stations can be arranged at any location along the optical fiber. In this device, optical lenses fitted between the fiber and each of the stations have to be placed in the immediate proximity of the fiber. The radial positioning of the lenses and of the associated stations is relatively critical.

In the document WO-A-9,839,861 a bi-directional optical transmission system between electronic components uses light diffused in the air inside a channel bounded by the optically reflecting internal surface of a U-shaped enclosure made of metal or plastic. The opto-electronic transmitter and receiver elements of the electronic components can be arranged at any location along the channel, but must on the other hand advance inside the channel. The distance of these components to the channel is therefore precisely defined.

OBJECT OF THE INVENTION

The object of the invention is to achieve an optical communication device not presenting the drawbacks of the prior art devices. Such a device must in particular enable optical coupling of electronic modules without requiring any special connectors or precise positioning of the modules.

According to the invention, this object is achieved by the fact that the lateral modules are slave modules designed to communicate with a master module optically coupled, axially, to the first end of the rod, the rod comprising a useful part equipped with lateral reflecting means forming a substantially continuous reflecting zone, the rod, which has a cross-section the surface whereof is greater than 15 mm$^2$, and the lateral reflecting means defining a continuous longitudinal lateral coupling zone along the useful part of the rod so as to enable bi-directional optical coupling of the master module with a lateral module arranged at any location along the useful part of the rod, the lateral coupling zone extending over at least one centimeter outside the rod.

According to a first development of the invention, the lateral reflecting means are formed by a plurality of adjacent notches constituting a reflecting zone in the form of serrated teeth along the useful part of the rod.

According to a second development of the invention, the lateral reflecting means comprise a narrow reflecting strip.

BRIEF DESCRIPTION OF THE DRAWINGS

Other advantages and features will become more clearly apparent from the following description of particular embodiments of the invention, given as non-restrictive examples only and represented in the accompanying drawings, in which.

DESCRIPTION OF PARTICULAR EMBODIMENTS

Figure 1:
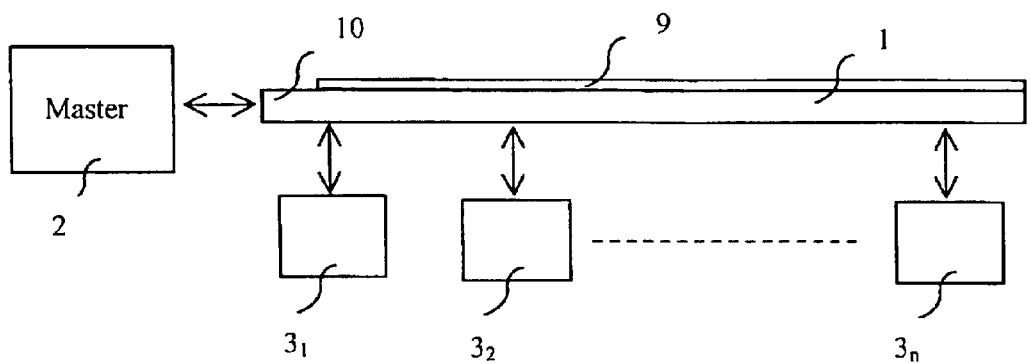
FIG. 1 is a schematic representation of a device according to the invention.
Figure 2:
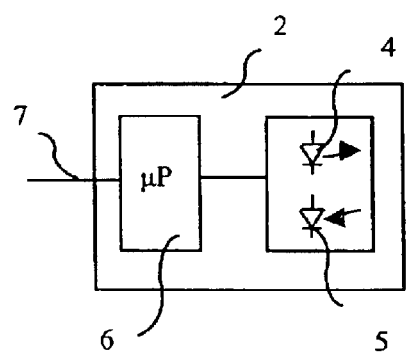
FIG. 2 represents an electronic module of a device according to the invention in greater detail.

The optical communication device represented in FIG. 1 comprises an optical fiber rod 1 forming a bi-directional optical communication bus between a master electronic module 2 and n slave electronic modules 3 ($3_1, 3_2, \ldots, 3_n$). Each electronic module comprises, like the master module 2 represented in FIG. 2, an electro-optical transmitter 4 (laser diode, light-emitting diode, . . . ) and an opto-electronic receiver 5 (photodiode, phototransistor) electrically coupled to an electronic processing unit 6, preferably a microprocessor. The latter can be electrically coupled for example by a bus 7 to external modules, supervisors, sensors, or actuators.

The optical fiber rod 1 is made from an optically conducting, electrically insulating material, such as glass, silica or preferably plastic, the latter material presenting the advantage of being able to be easily molded. Various thermoplastic materials can be used such as polycarbonate, PMMA (polymethyl methacrylate), PVC, plexiglass, etc.

The optical fiber rod 1 has a cross-section greater than 15 mm$^2$, preferably comprised between 25 and 100 mm2, much larger than the cross-section of conventional optical fibers. In a preferred embodiment, it is rigid and has a length of about 50 cm to 1 m.

Figure 3:
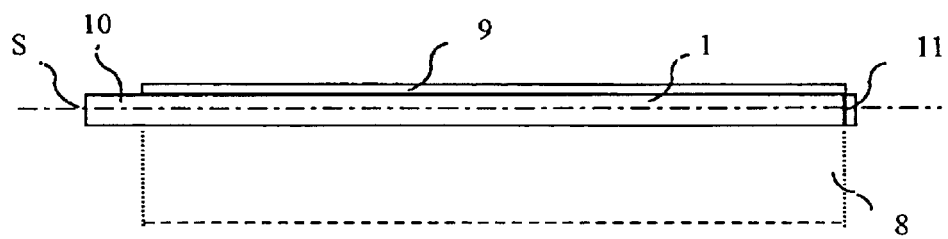
FIG. 3 illustrates an optical fiber rod and the lateral coupling zone of a device according to the invention.

Optical communication can be achieved by means of such a rod over short distances between the master module 2 and slave modules 3. The master module 2 is optically coupled axially to a first end of the rod (on the left in FIGS. 1, 3 to 12, 17 to 19). The lateral modules 3 are arranged side by side laterally along the rod and communicate optically with the optical rod 1 in a lateral coupling zone 8 represented in FIGS. 3 and 19. The lateral coupling zone 8 is situated opposite a lateral reflector. It extends outside the rod over at least one centimeter, typically several centimeters for example, perpendicularly to the longitudinal axis S of the optical rod 1. The lateral reflector 9 forms a substantially continuous reflecting zone over a longitudinal part of the external surface of the rod opposite the lateral modules 3. The width of the reflecting zone is preferably limited to less than 25% of the perimeter of the cross-section of the optical rod (FIGS. 10 to 16 and 20) to limit losses.

In a preferred embodiment, the optical rod 1 comprises at its first end an end section 10 not equipped with a lateral reflector 9. The lateral modules 3 can not be arranged along the end section 10, but only along the useful part of the rod 1 facing the lateral reflector 9. An end reflector 11 (FIGS. 3, 4, 10 to 12, 18 and 19) is preferably arranged on a second end of the optical rod opposite the first end.

Figure 4:
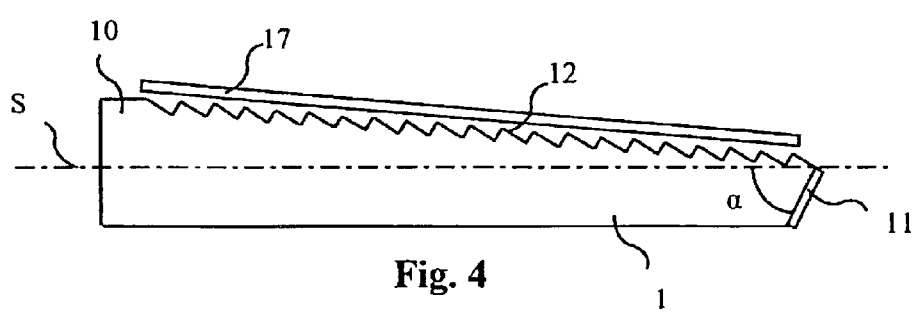
FIGS. 4 to 12 represent various embodiments of a lateral reflector of a device according to the invention.

In a preferred embodiment, represented in FIG. 4, the optical rod 1 is of beveled shape, its cross-section decreasing substantially continuously from the first end to the second end so as to limit the losses in the optical rod and to optimize the efficiency of the device. For example purposes, the cross-section of the optical rod can vary between 100 mm$^2$ at the first end and 50 mm$^2$ at the second end. Furthermore, the second preferably reflecting end 11 is inclined so as to send the light waves back in the direction of the lateral reflector 9. To give an example, the angle α between the longitudinal axis S of the rod 1 and the second end can be comprised between 70° and 90°. In a preferred embodiment α=80°.

Different embodiments of the lateral reflector 9 are illustrated in FIGS. 4 to 12. The essential function of the lateral reflector is to partially transform, with minimum losses, the substantially radial propagation of the light waves coming from a slave module 3 into substantially axial propagation and the substantially axial propagation of the light waves coming from the master module 2 into substantially radial propagation able to be detected by the slave modules 3. The surfaces not used for this function must enhance guiding of the light waves internal to the optical rod 1.

Figure 5:
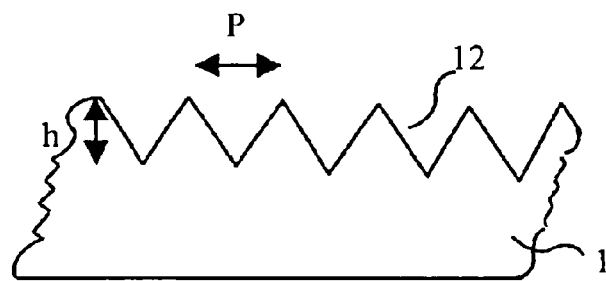
Figure 6:
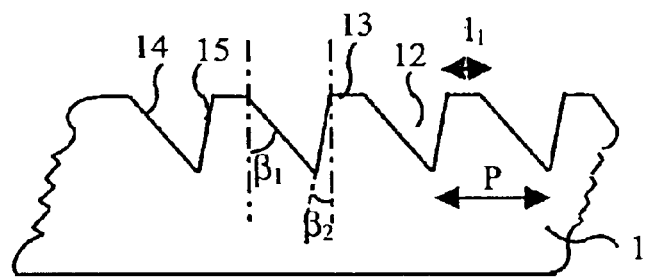

According to a first embodiment of the lateral reflector 9, the latter is formed by a plurality of adjacent notches 12, of depth h, constituting a substantially continuous reflecting zone, in the form of serrated teeth with a pitch p, along the useful part of the rod. Each notch can be asymmetric (FIGS. 4 and 6 to 8) or symmetric (FIG. 5). According to a preferred alternative embodiment, represented in FIG. 6, two adjacent notches 12 are separated by an external flat surface 13 of width $1_1$.

When the notches 12 are asymmetric, they are each bounded by a first oblique face 14 forming an angle $\beta_1$ with an axis perpendicular to the longitudinal axis S of the optical rod, and a second oblique face 15, closer to the second end of the optical rod and forming an angle $\beta_2$, smaller than $\beta_1$, with the axis perpendicular to the longitudinal axis S.

Figure 7:
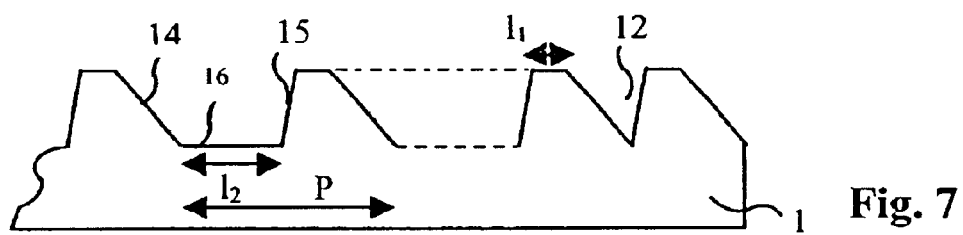

To improve and homogenize the extraction efficiency of the light waves along the optical rod 1, it is possible to modify the pitch p, which decreases progressively between the first and second end of the optical rod. According to an alternative embodiment (FIG. 7), an internal flat surface 16 of variable width $1_2$, decreasing progressively between the first and second ends, is provided in the bottom of the notches 12, between the oblique faces 14 and 15. In FIG. 7, the internal flat surface 16 is reduced to zero at the second end of the optical rod. According to another alternative embodiment (FIG. 8), modification of the pitch p is obtained by modification of the angle $\beta_1$, which decreases progressively between the first and second ends of the rod. These two variants can also be associated.

Figure 8:
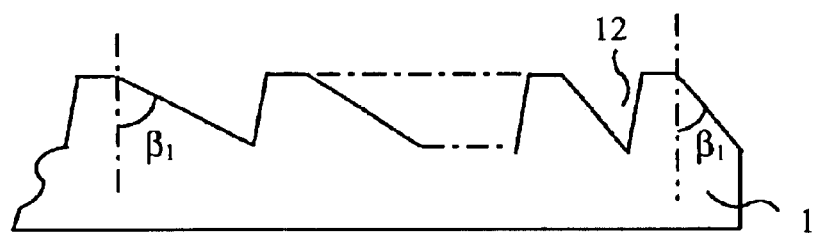
Figure 9:
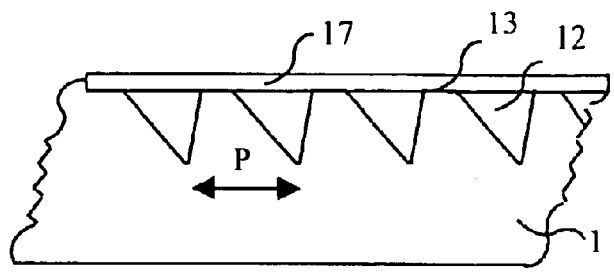

When the pitch is variable, according to the embodiment of FIG. 8, the angle $\beta_1$ can vary from 90°—the case where there is no light wave extraction close to the first end—to 45° at the second end of the optical rod.

As an example, the dimensions of the lateral reflector can be as follows:

p=2 mm h=1 mm $1_1$=0.5 mm $\beta_1$=45°

$\beta_2$=27°

To increase the extraction efficiency, by about 10 to 15%, an additional lateral reflector 17 can be arranged parallel to the reflecting zone formed by the notches so as to send the light rays diverted to the outside on the side where the lateral reflector 9 is located back to the optical rod 1. The additional lateral reflector 17 is formed by a narrow reflecting strip located in the immediate proximity of the reflector 9, either at a small distance (1 to 2 mm for example) as in FIG. 4, or directly in contact with the external flat surfaces 13, as in FIG. 9.

The additional lateral reflector 17 can be fixed by any suitable means. According to a particular embodiment, it can form an integral part of a white reflecting plastic part having the additional function of holding and protecting the optical rod 1. If it is in contact with the external flat surfaces 13 (FIG. 9), it can be fixed by sticking or formed by molding from a casting on the optical rod.

Figure 10:
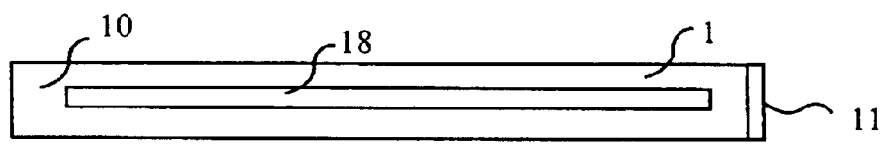
Figure 11:
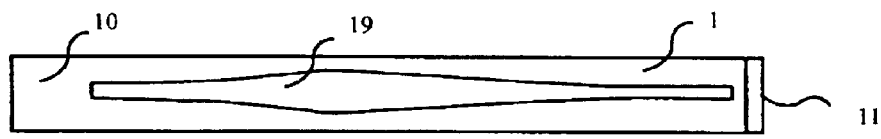
Figure 12:
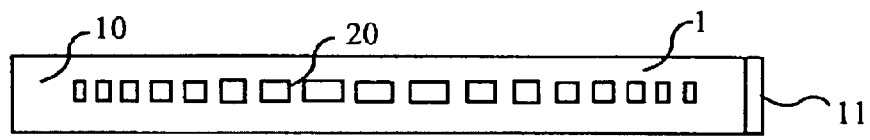
Figure 13:
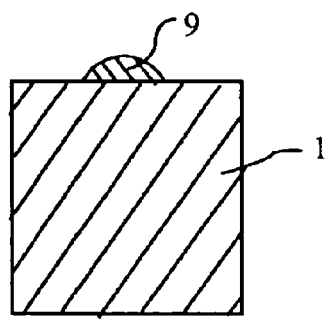
FIGS. 13 to 16 represent different embodiments of the cross-section of an optical fiber rod of a device according to the invention.
Figure 14:
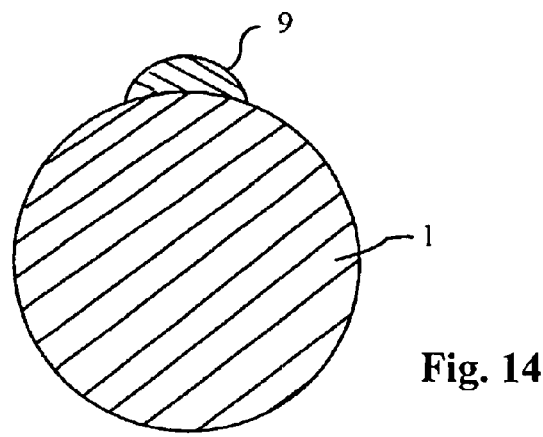
Figure 15:
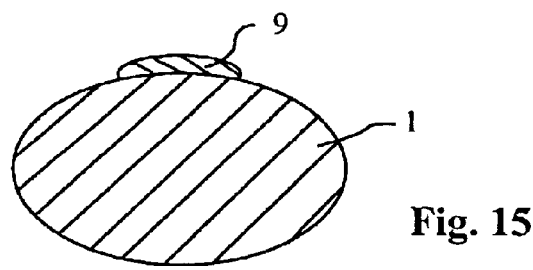
Figure 16:
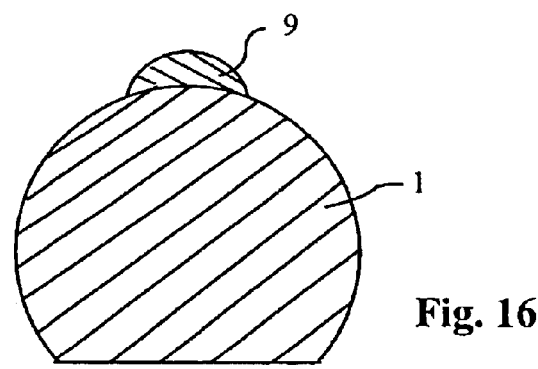

According to alternative embodiments of the invention represented in FIGS. 10 to 12, the lateral reflector 9 can be formed solely by a narrow reflecting strip formed on the useful part of the rod, although the performances are then substantially lower than those of a device with notches according to FIGS. 4 to 9. In this case, as in the case of the additional lateral reflector 17 (FIGS. 4 and 9), several embodiments can be envisioned. In FIG. 10, the reflecting strip is a continuous rectangular strip 18. According to an alternative embodiment represented in FIG. 11, the reflecting strip is a continuous strip 19 of variable width, minimal near to the first end of the rod, then increasing up to a maximum and thence decreasing. This enables the useful surface of the lateral reflector at its ends to be minimized. According to another alternative embodiment represented in FIG. 12, the reflecting strip is fragmented into elemental reflecting zones, thus forming a discontinuous strip 20. The reflecting zones that constitute the latter have a variable length and/or surface, minimal near to the first end of the rod and increasing continuously in the direction of the second end. The characteristics of the reflecting strips 19 and 20 can be combined.

The reflecting strip (18, 19, 20) can be formed by any suitable means on the optical rod, for example by molding from a casting, by deposition of a paint or by sticking. It can also be formed by micro-mirrors or by a reflecting film behaving as a set of micro-mirrors.

The cross-section of the optical rod 1 can be rectangular (FIG. 13), the lateral reflector 9 being arranged on a first lateral face of the rod and the slave modules 3 arranged along the rod, facing a lateral face opposite the first face. The cross-section is preferably circular (FIG. 14) or ovoid (FIGS. 16 and 20), the lateral reflector being in this case located on a flattened face of the rod.

The optical rod 1 is preferably formed, at the same time as the notches 12, by injection molding of a plastic material transparent at the transmission wavelength of the electro-optical transmitters 4 of the electronic modules 2 and 3 and presenting good temperature resistance properties. As a variant, it can also be manufactured by thermoforming or by extruding. The notches 12 can also be obtained by subsequent machining of the optical rod.

The wavelength used can be chosen in the visible (in the green for example) or preferably in the infrared for which high-integration transmitters and receivers are currently available. Integrated opto-electronic transmitter-receiver components for data transmission of the type referred to as "IRDA" can fulfill this function. The data exchange protocol, of any known type, is managed by the master module 2. According to a preferred embodiment, the latter periodically transmits a frame initializing the exchanges. On receipt of this frame, each slave module 3 transmits in a time window allocated to it, scanning being terminated after the last slave module 3n has transmitted. The absence, or malfunctioning, of a slave module is detected by its silence in the allocated time window.

Figure 17:
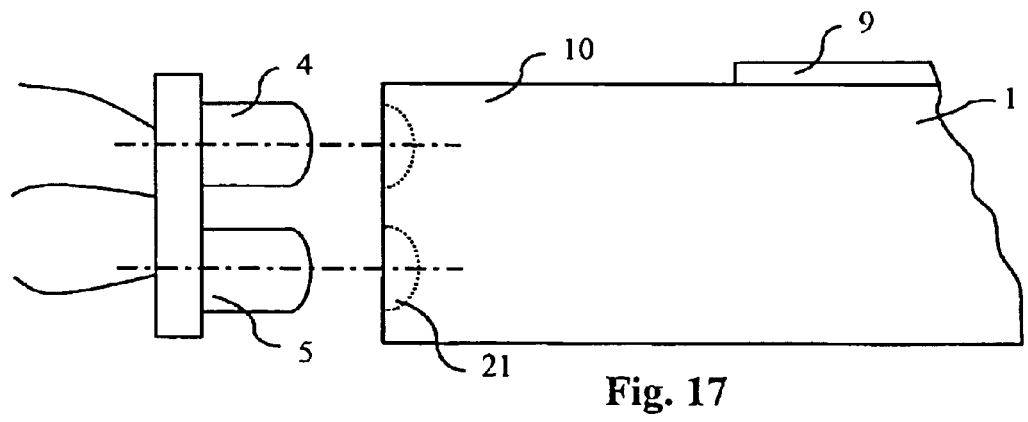
FIG. 17 represents a particular embodiment of coupling of the optical fiber rod to a master module of a device according to the invention in greater detail.

FIG. 17 illustrates a particular embodiment of connection of the optical rod 1 to the master module 2. The rod 1 comprises at its first end two grooves 21 designed for flush-mounted housing of diodes respectively constituting the electro-optical 4 transmitter (light-emitting diode) and the opto-electronic receiver 5 (photodiode) of the master module 2.

Figure 18:
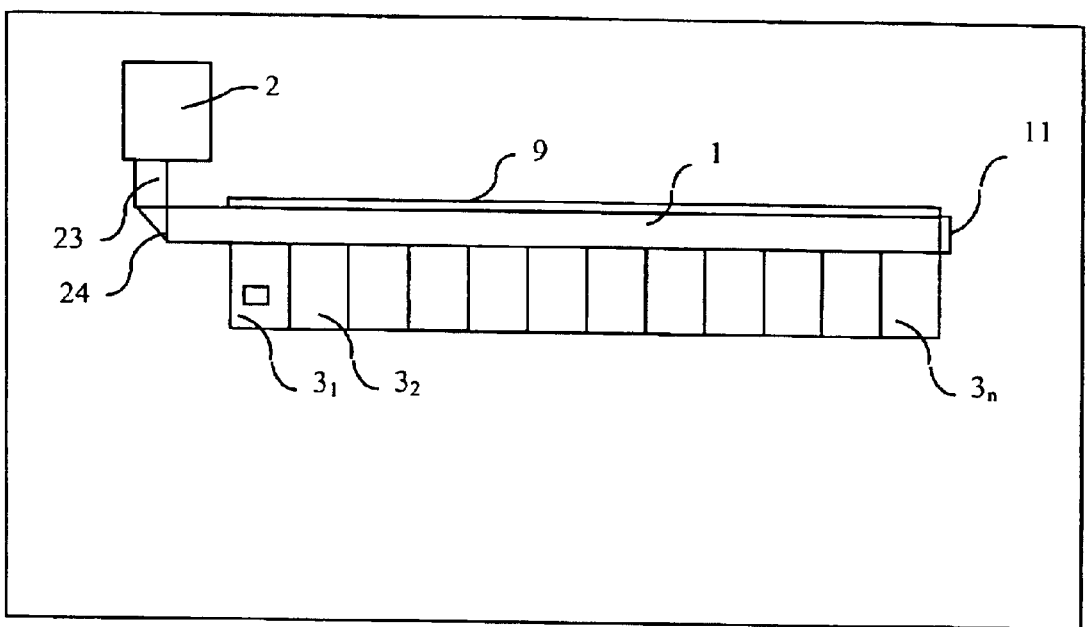
FIG. 18 illustrates the arrangement of a device according to the invention in an electrical panel.

An application of a device according to the invention in an electrical panel 22 is illustrated in FIG. 18. A plurality of modular electrical control/monitoring and/or protection units, for example circuit breakers, switches and/or relays, constituting the slave modules $3_1, 3_2, \ldots, 3_n$, are arranged side by side in the panel, along an optical rod 1 fixed by any suitable means in the panel. In order to maximize the number of slave modules able to communicate by means of the optical rod 1, the master module 2, constituted by a control/monitoring module, is preferably arranged at a location remote from the panel. In FIG. 18 the rod 1 is horizontal, and the master module 2 is located remotely in the vertical and upward direction. Axial optical connection thereof with the first end of the rod 1 is performed by means of an additional optical rod 23 arranged perpendicularly to the rod (vertically in FIG. 18) and comprising, at its bottom part in FIG. 18, a coupling end for coupling with the first end of the rod 1. The coupling end of the additional optical rod 23 comprises an external face in contact with the first end of the rod 1 and a reflecting end surface 24 forming an angle of 45° with the first end of the rod.

Figure 19:
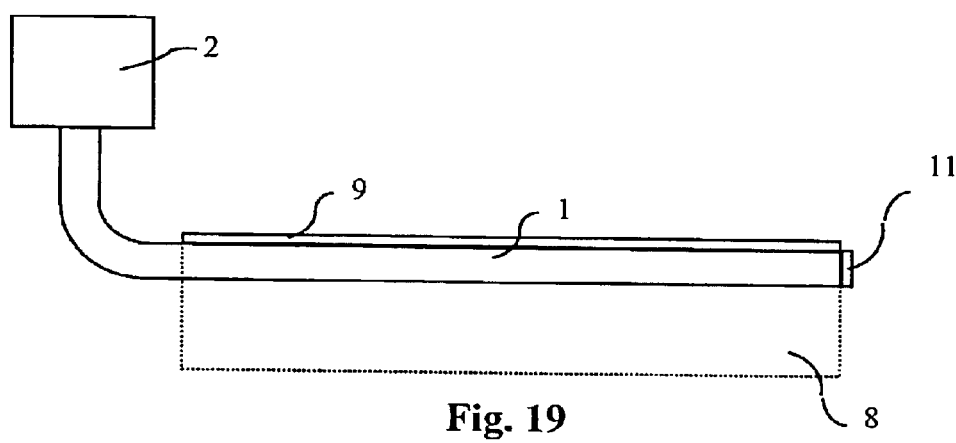
FIG. 19 illustrates an alternative embodiment of a device according to FIG. 18.

According to an alternative embodiment illustrated in FIG. 19, the rod 1 is bent at its first end so as to comprise an end part perpendicular to the useful part of the rod, enabling the master module 2 to be located remotely.

Figure 20:
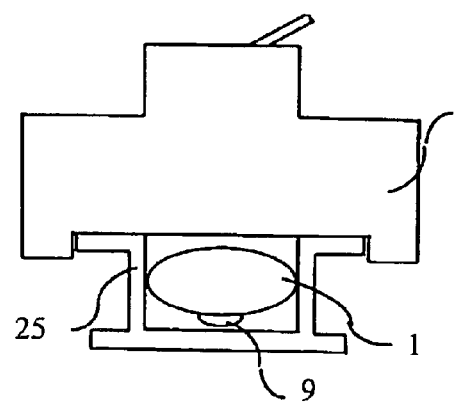
FIG. 20 illustrates a particular embodiment of a device according to the invention.

According to the particular embodiment of a device according to the invention illustrated in FIG. 20, the optical rod 1, of ovoid cross-section, is housed at the bottom of a rail 25, of DIN type for example, designed to act as support for slave modules 3. The slave modules 3 are conventionally arranged side by side on the rail. They each comprise a transmitter element 4 and receiver element 5 at their bottom part facing the inside of the rail. They can thus communicate with a master module by means of the optical bus formed by the rod. Such an arrangement enables existing panels not provided with this optical communication function to be completed, without any special adaptation being required for fitting the rod.

As an example, in a device of this type, 16 slave modules with a width of 35 mm can communicate with a master module by means of an optical rod 1 having a useful length of 56 cm, with signals of about 100 milliwatts (mW) and a transmission rate of about 1 to 10 megabits.

With the device according to the invention, the slave modules 3 can be positioned anywhere along the useful part of the rod 1, and their lateral location is not critical in so far as their transmitters 4 and receivers 5 merely have to be located within the lateral coupling zone 8 which extends, outside the rod, over at least one centimeter perpendicularly to the longitudinal axis S of the rod 1.

It is possible to envisage doubling the number of slave modules 3 communicating with a single master module 2 by means of an optical rod 1. For this, a second lateral reflector can be arranged at an angle of 90° from the lateral reflector 9 on the optical rod 1. Slave modules 3 can then be arranged respectively facing the lateral reflector 9 and facing the second lateral reflector.

What is claimed:

1. Device for optical communication between electronic modules comprising an optically conducting rod (1), having first and second ends, designed to be optically coupled, by lateral coupling, to lateral electronic modules (3) arranged laterally along the rod, and comprising lateral reflecting means (9) arranged over a longitudinal part of the external surface of the rod (1) opposite the lateral modules (3), device characterized in that the lateral modules (3) are slave modules designed to communicate with a master module (2) optically coupled, axially, to the first end of the rod, the rod (1) comprising a useful part equipped with the lateral reflecting means (9) forming a substantially continuous reflecting zone, the rod, which has a cross-section the surface whereof is greater than 15 mm$^2$, and the lateral reflecting means defining a continuous longitudinal lateral coupling zone (8) along the useful part of the rod so as to enable bi-directional optical coupling of the master module (2) with a lateral module (3) arranged at any location along the useful part of the rod, the lateral coupling zone (8) extending over at least one centimeter outside the rod.

2. Device according to claim 1, characterized in that the lateral reflecting means (9) are formed by a plurality of adjacent notches (12) constituting a reflecting zone in the form of serrated teeth along the useful part of the rod (1).

3. Device according to claim 2, characterized in that each notch (12) is symmetric.

4. Device according to claim 2, characterized in that each notch (12) is asymmetric and is bounded by a first oblique face (14), forming a first angle ($\beta_1$), with an axis perpendicular to the longitudinal axis (S) of the rod (1), and a second oblique face (15), closer to the second end of the rod (1) and forming a second angle ($\beta_2$), smaller than the first angle ($\beta_1$), with the axis perpendicular to the longitudinal axis (S) of the rod (1).

5. Device according to claim 4, characterized in that the adjacent notches (12) have a variable pitch (p), decreasing progressively between the first and second ends of the rod (1).

6. Device according to claim 5, characterized in that the lateral reflecting means (9) comprise an internal flat surface (16) at the bottom of the notches (12), the flat surface having a variable width ($l_2$), decreasing progressively between the first and second ends of the rod (1).

7. Device according to claim 5, characterized in that the first angle ($\beta_1$) decreases progressively between the first and second ends of the rod (1).

8. Device according to claim 2, characterized in that two adjacent notches (12) are separated by an external flat surface.

9. Device according to claim 1, characterized in that the lateral reflecting means (9) comprise a narrow reflecting strip (17, 18, 19, 20).

10. Device according to claim 9, characterized in that the reflecting strip is a continuous rectangular strip (18).

11. Device according to claim 9, characterized in that the reflecting strip is a fragmented strip (20), comprising elemental reflecting zones of variable length arranged longitudinally with preset pitch, the length of the elemental reflecting zones, minimal near to the first end of the rod (1), increasing to a preset maximum value then decreasing up to the second end of the rod (1).

12. Device according to claim 9, characterized in that the reflecting strip is a strip (19) of variable width, minimal near to the first end of the rod (1), increasing to a preset maximum value then decreasing up to the second end of the rod.

13. Device according to claim 11, characterized in that the maximum value is closer to the second end of the rod (1) than to the first end thereof.

14. Device according to claim 9, characterized in that the reflecting strip (17, 18, 19, 20) is obtained by deposition of a material of suitable optical index on the external surface of the rod (1).

15. Device according to claim 1, characterized in that the rod (1) comprises, at its first end, an end section (10) not equipped with a lateral reflecting means.

16. Device according to claim 1, characterized in that the rod (1) has a circular cross-section.

17. Device according to claim 1, characterized in that the rod (1) has an ovoid cross-section.

18. Device according to claim 1, characterized in that the rod (1) has a rectangular cross-section, the lateral reflecting means (9) being arranged on a first lateral face of the rod and the lateral modules (3) arranged along the rod, facing a lateral face opposite the first face.

19. Device according to claim 1, characterized in that the cross-section of the rod (1) decreases continuously from the first end of the rod to the second end thereof.

20. Device according to claim 1, characterized in that the second end of the rod (1) comprises an end reflector (11).

21. Device according to claim 1, characterized in that the second end of the rod (1) is inclined ($\alpha$) with respect to the longitudinal axis (S) of the rod.

22. Device according to claim 1, characterized in that the first end of the rod (1) comprises means (21) for flush-mounted housing of electro-optical transmitter (4) and opto-electronic receiver (5) elements of the master module (2).

23. Device according to claim 1, characterized in that the lateral modules (3) are electrical control/monitoring and/or protection units, arranged in an electrical panel (22).

24. Device according to claim 23, characterized in that the lateral modules (3) are arranged side by side along the useful part of the rod (1).

25. Device according to claim 24, characterized in that the master module (2) is situated at a location remote from the electrical panel (22) and optically connected to the first end of the rod (1) by an additional optical rod (23) comprising a coupling end for coupling with the first end of the rod (1).

26. Device according to claim 25, characterized in that the additional optical rod (23) is arranged perpendicularly to the rod (1), with a coupling end comprising an external face in contact with the first end of the rod (1) and a reflecting end surface (24) forming an angle of 45° with the first end of the rod.

27. Device according to claim 24, characterized in that the rod (1) has an elbow at its first end.

* * * * *